United States Patent [19]

Sakata

[11] Patent Number: 5,029,031
[45] Date of Patent: Jul. 2, 1991

[54] COMPOSITE TYPE MAGNETIC HEAD ASSEMBLY WITH SIMPLIFIED AZIMUTH ANGLE ADJUSTMENT

[75] Inventor: Masaya Sakata, Tokyo, Japan
[73] Assignee: TEAC Corporation, Japan
[21] Appl. No.: 410,910
[22] Filed: Sep. 22, 1989
[30] Foreign Application Priority Data
Sep. 28, 1988 [JP] Japan .................. 63-242949
[51] Int. Cl.$^5$ .............................. G11B 5/56
[52] U.S. Cl. .................... 360/109; 360/121
[58] Field of Search .......... 360/109, 10, 121
[56] References Cited

U.S. PATENT DOCUMENTS

| 2,969,584 | 1/1961 | Bobb | 360/109 |
| 3,457,556 | 7/1969 | Kelly | 360/109 |

FOREIGN PATENT DOCUMENTS 0580575 11/1977 U.S.S.R. ............... 360/109

Primary Examiner—David J. Severin
Attorney, Agent, or Firm—Andrus, Sceales, Starke & Sawall

[57] ABSTRACT

A composite type magnetic head assembly for recording and/or reproducing an information signal on and from a magnetic tape transported in a predetermined direction comprises a plurality of magnetic heads aligned in the predetermined direction with a predetermined separation, each of the magnetic heads carrying a plurality of magnetic cores aligned generally perpendicularly to the predetermined direction, deformable connection member provided substantially in coincidence with a center line passing in the predetermined direction through a central part of the plurality of magnetic cores on each of the plurality of magnetic heads for providing a fulcrum deformably connecting the plurality of magnetic heads each other, and adjusting member provided so as to engage with a pair of neighboring magnetic heads for modifying the predetermined separation.

7 Claims, 3 Drawing Sheets

COMPOSITE TYPE MAGNETIC HEAD ASSEMBLY WITH SIMPLIFIED AZIMUTH ANGLE ADJUSTMENT

BACKGROUND OF THE INVENTION

The present invention generally relates to magnetic heads for magnetic recording and/or reproducing and more particularly to a composite type magnetic head assembly used in a stationary head type magnetic recording and/or reproducing apparatus such as audio tape recorder or data recorder for recording and/or reproducing an information signal on and from a magnetic tape by a stationary magnetic head carried therein.

Conventionally, there is a magnetic tape recorder such as cassette tape recorder, multi-track tape recorder, data recorder and the like in which a composite type magnetic head assembly is used for recording and/or reproducing an information signal on and from a magnetic tape. The composite type magnetic head assembly comprises a plurality of magnetic heads mounted on a common base body which in turn is mounted on a frame of the tape recorder such that each of the magnetic heads maintains a predetermined relationship with the magnetic tape.

In such a magnetic tape recorder using the composite type magnetic head assembly, it is necessary to adjust the position of the magnetic head such that the offset of the magnetic head in the lateral direction of the magnetic tape as well as the offset of the azimuth angle are eliminated for each of the magnetic heads in the assembly and such that the magnetic heads are properly aligned on the track formed in the magnetic tape. For this purpose, a complex mounting mechanism is used for adjustably mounting the magnetic head assembly on the frame of the tape recorder as is disclosed in the Japanese Laid-open Utility Model Application No. 56-2135. In this mechanism, each of the magnetic heads are mounted adjustably on a common body which in turn is mounted adjustably on the frame.

FIG. 1 shows a principle of azimuth angle adjustment according to a prior art. The view is taken in plane of the magnetic tape which is transported from the left to the right, and shows a first magnetic head H1 which is already adjusted and a second magnetic head H2 which is to be adjusted. The distance between a gap G1 of the magnetic head H1 and a gap G2 of the magnetic head H2 is represented by d. Further, there is provided a fulcrum P1 at the bottom of the magnetic head H2 in the drawing or at the right side of the head H2 when viewed in the tape passing direction and the magnetic head H2 is tilted about the fulcrum P1 in the plane of the paper in the clockwise direction or in the counterclockwise direction. In the drawing, the magnetic head H2 is tilted counterclockwise from an azimuth angle $\theta_1$ to an azimuth angle $\theta_0$ for the adjustment. In other words, the azimuth angle $\theta_0$ represents the azimuth angle which is adjusted properly.

In such an adjustment, the displacement of the magnetic core in the magnetic head H2 associated with the tilting of the head becomes increasingly large with increasing distance from the fulcrum P1. Thus, a displacement d1 of a magnetic core C1 corresponding to a track No. 1 closest to the fulcrum P1 is given as $d1 = A1.\sin\theta$, a displacement d2 of a magnetic core C2 corresponding to a track No. 2 next closest to the fulcrum P1 is given as $d2 = A2.\sin\theta$, and a displacement d3 of a magnetic core C3 corresponding to a track No. 3 which is the farthest from the fulcrum P1 is given as $d3 = A3.\sin\theta$, where A1, A2 and A3 are the distance from the fulcrum P1 to the magnetic cores C1-C3 respectively and $\theta$ represents the difference of angle between the azimuth angle $\theta_1$ and the azimuth angle $\theta_2$. Note that there holds a relation $A1 < A2 < A3$ and as a result, the displacement d2 becomes larger than the displacement d1 and the displacement d3 becomes larger than any of the displacements d1 and d2 in a same azimuth angle adjustment. In other words, there holds a relation $d1 < d2 < d3$.

In such an adjustment of the azimuth angle, therefore, there is a tendency that a minute error in the azimuth angle adjustment causes a large displacement of the magnetic core particularly at the track far from the fulcrum. In order to avoid such an error associated with the adjustment, the manufacturing of the magnetic head has to be controlled strictly. However, such a strict control wastes time and invites increase of the cost of the manufactured magnetic head assembly.

Further, the prior art azimuth angle adjustment described with reference to FIG. 1 requires a complex mechanism using a number of parts which not only invites increase of the cost but also an increase of space to be occupied by the magnetic head assembly. The latter problem is particularly serious in the case of compact portable cassette tape recorder where there is a severe limitation in the space for the magnetic head assembly.

SUMMARY OF THE INVENTION

Accordingly, it is a general object of the present invention to provide a novel and useful composite type magnetic head assembly wherein the aforementioned problems are eliminated.

Another and more specific object of the present invention is to provide a composite type magnetic head assembly for use in a magnetic tape recording and/or reproducing apparatus wherein adjustment of the azimuth angle for each of the magnetic heads in the assembly can be performed simply and with a high precision.

Another object of the present invention is to provide a composite type magnetic head assembly comprising a plurality of magnetic heads wherein the effect of error in the adjustment of the azimuth angle of the magnetic heads on the deviation from proper alignment of the magnetic heads with respect to tracks on a magnetic tape is substantially minimized.

Another object of the present invention is to provide a composite type magnetic head assembly having a simple and compact structure which occupies a reduced space when mounted on a magnetic tape recording and/or reproducing apparatus.

Another object of the present invention is to provide a composite type magnetic head assembly comprising a base body divided into a plurality of sections each connected to a neighbouring section by a flexible joint structure, each flexible joint structure being formed so as to align in a tape passing direction, a plurality of magnetic heads provided in correspondence to the plurality of sections such that each of the magnetic heads is carried by a corresponding section of the base body and such that magnetic cores carried by the magnetic head are disposed symmetrically about a symmetrical axis extending along the the flexible joint structures aligned in the tape passing direction, and adjusting means provided on the base body so as to actuate the flexible joint structure for azimuth angle adjustment. According to the present invention, the displacement of the magnetic core at the time of the azimuth angle adjustment is performed symmetrically about the flexible joint structure and the displacement of the magnetic core associated with the azimuth angle adjustment is substantially reduced. Further, the construction of the base body is simple as the base body may be formed as an integral body. In this case, the flexible joint structure may simply be a part of the base body having a reduced width and the composite magnetic head assembly can be made to have a compact size suitable for use in compact tape recorders. The azimuth angle adjustment can be performed simply by driving an adjusting screw provided as the adjusting means so as to change the distance between a neighbouring pair of the sections. As the adjusting means is constructed simply as such, the reduction of size of the composite type magnetic head assembly is further facilitated.

Other objects and further features of the present invention will become apparent from the following detailed description when read in conjunction with attached drawings.

DETAILED DESCRIPTION

Figure 2:
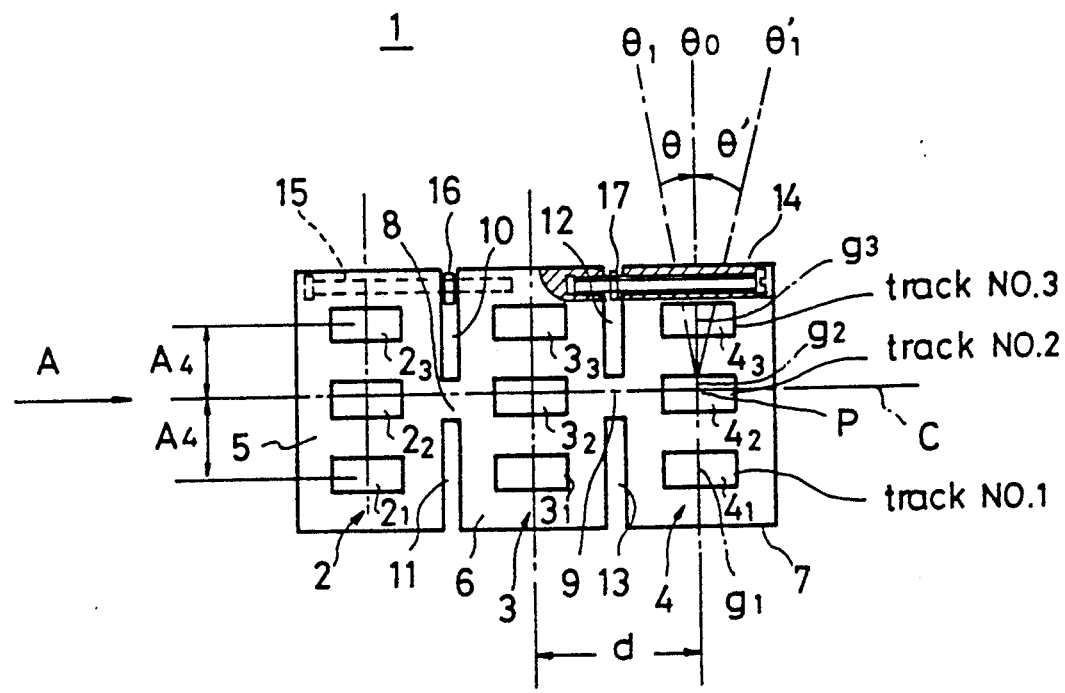
FIG. 2 is a diagram showing the construction of the composite type magnetic head assembly according to an embodiment of the present invention.

FIG. 2 shows a first embodiment of the composite type magnetic head assembly of the present invention. Referring to the drawing, the magnetic head assembly comprises three magnetic heads 2, 3 and 4 arranged in a tape passing direction A. The magnetic heads respectively carry magnetic cores $2_1$–$2_3$, $3_1$–$3_3$, and $4_1$–$4_3$ wherein the magnetic cores $2_1$–$4_1$ correspond to a track No. 1 on a magnetic tape (not shown), the magnetic cores $2_2$–$4_2$ correspond to a track No. 2 adjacent to the track No. 1, and the magnetic cores $2_3$–$4_3$ correspond to a track No. 3 at an opposite side of the track No. 1 with respect to the track No. 2. Note that the magnetic head 2 comprises a case 5 of permalloy and the like for magnetic shielding and the magnetic cores $2_1$–$2_3$ are embedded in the case 5. Similarly, the magnetic cores $3_1$–$3_3$ are embedded in a permalloy case 6 of the magnetic head 3 and the magnetic cores $4_1$–$4_3$ are embedded in a permalloy case 7 of the magnetic head 4. Further, the case 5 of the magnetic head 2 and the case 6 of the magnetic head 3 are connected by a joint part 8 and the case 6 and the case 7 of the magnetic head 4 are connected by a joint part 9.

The joint parts 8 and 9 are made of a material which is the same as that of the cases 5–7 or other material having a similar elasticity and hardness, and has a reduced width which provides a suitable flexibility. More specifically, the first case 5 can be tilted in the plane of the paper with respect to the second case 6 because of the flexibility of the joint part 8 and the third case 7 can be tilted with respect to the second case 6 because of the flexibility of the joint part 9. As the magnetic heads 2–4 are arranged in the tape passing direction A, the cases 5–7 are also aligned in the direction A and the joint part 8 and the joint part 9 are formed such that they are are generally aligned on a center line C passing centrally through the head assembly 1 along the tape passing direction A. It should be noted that the magnetic cores $2_1$–$2_3$ are arranged symmetrically about the center line C which in turn coincides with the center of the tracks No.1 –No. 3 formed on the magnetic tape. Similarly, the magnetic cores $3_1$–$3_3$ are arranged symmetrically about the center line C and the magnetic cores $4_1$–$4_3$ are arranged also symmetrically about the center line C. Associated with the formation of the joint parts 8 and 9 having the reduced width as already described, there are formed a pair of slits 10 and 11 extending laterally from both sides of the head assembly 1 toward the joint part 8 at the center and there are formed another pair of slits 12 and 13 also extending laterally toward the joint part 9. In other words, the slits 10-13 extend perpendicularly to the center line C.

Across the slit 12, there is further provided an adjusting screw 14 which bridges the case 6 and the case 7. More in detail, there is provided a through hole extending in the tape passing direction A throughout the case 7 in a vicinity of a top end thereof or a left end when viewed in the direction A, and there is further provided a corresponding threaded hole also extending in the direction A in the second case 6. The adjusting screw 14 is accepted in the through hole in the case 7 and is threaded into the corresponding hole in the case 6. The through hole and the threaded hole are provided such that the screw 14 does not contact or make any engagement with the magnet cores carried by the cases 6 and 7. Further, there is provided a compressional spring 17 around a part of the screw 14 exposed by the slit 12 and the spring 17 urges the cases 6 and 7 such that the separation between the cases 6 and 7 increases. Similarly, another adjusting screw 15 is provided so as to bridge the case 5 and the case 6 across the slit 10, and a compressional spring 16 is provided around the screw 15.

It is preferred that the joint parts 8 and 9 have a thickness which is identical to the thickness of the cases 5–7 so as to minimize the unwanted change of the tilt angle which is an angle of tilt of the cases 5–7 in a plane vertical to the plane of the paper of FIG. 2. Here, the thickness is measured perpendicularly to the plane of the paper. This construction, however, is not absolutely necessary but may be omitted depending on the structure of the magnetic heads or the structure of the base holding the magnetic head assembly.

When performing the azimuth angle adjustment, the composite type magnetic head assembly 1 of FIG. 2 is mounted on a base not illustrated and the position of the magnetic head 3 at the center of the assembly 1 is first adjusted with respect to the lateral position of the magnetic tape and further with respect to the azimuth angle such that the magnetic cores $3_1$–$3_3$ trace the respective tracks on the magnetic tape properly. As a result of the adjustment of the magnetic head 3, the lateral position of the magnetic heads 2 and 4 with respect to the magnetic tape is also adjusted. Next, the adjusting screws 14 and 15 are driven slightly such that the magnetic head 2 and the magnetic head 4 are individually tilted in the plane of paper of FIG. 2 for the azimuth adjustment. As the adjustment with respect to the lateral position of the magnetic tape is already achieved also for the magnetic heads 2 and 4 at the time when the head assembly 1 is mounted on the base, the adjustment of the head assembly 1 is completed simply by adjusting the screws 14 and 15.

Figure 1:
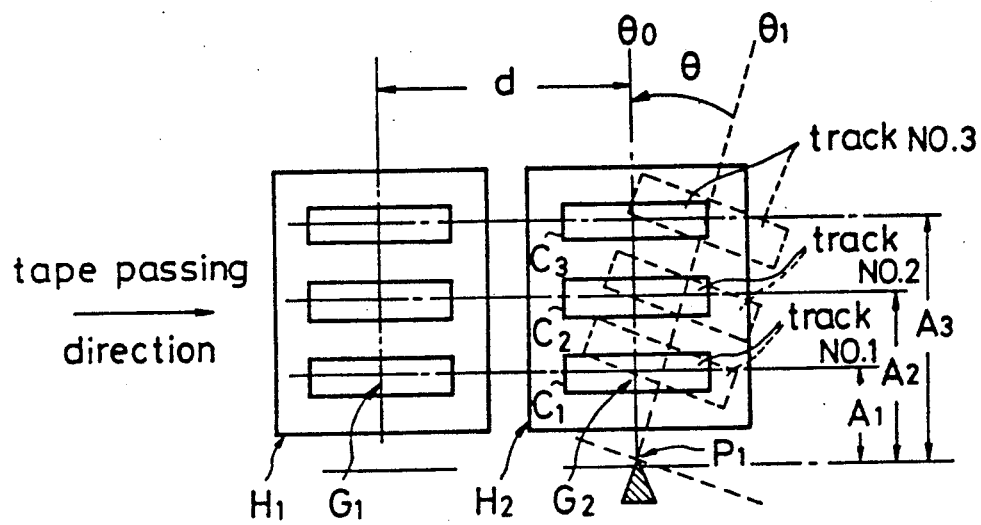
FIG. 1 is a diagram showing the principle of azimuth angle adjustment in a prior art composite type magnetic head assembly and a problem associated therewith.

It should be noted that the displacement of the magnetic cores in the magnetic head 5 or 7 associated with the azimuth angle adjustment is caused about the joint parts 8 or 9 which is located at the center line C. As a result, the displacement of the magnetic core is substantially reduced as compared to the case of the prior art shown in FIG. 1 because of the reduced distance between the magnetic core and the center line C. FIG. 2 shows such a displacement of a gap $g_1$ of the core $4_1$ below the center line C or a displacement of a gap $g_3$ above the center line C about a gap $g_2$ of the core $4_2$ located exactly on the center line C. Approximating that the tilting of the magnetic head 4 occurs about the gap $g_2$, the displacement for the gap $g_1$ and the gap $g_3$ associated with the azimuth angle adjustment is given as $$d_1 = A_4 \cdot \sin\theta$$

for the gap $g_1$ and $$d_2 = -A_4 \cdot \sin\theta$$

for the gap $g_3$, where $A_4$ stands for the distance between the gap $g_1$ or $g_3$ and the center line C. As the distance $A_4$ is substantially less than the distance $A_3$ in FIG. 1, it will be understood that the displacement of the magnetic core at the time of the azimuth angle adjustment is significantly reduced by the present invention and thus the effect of the error in azimuth angle adjustment on the position of the magnetic core is minimized.

Figure 3:
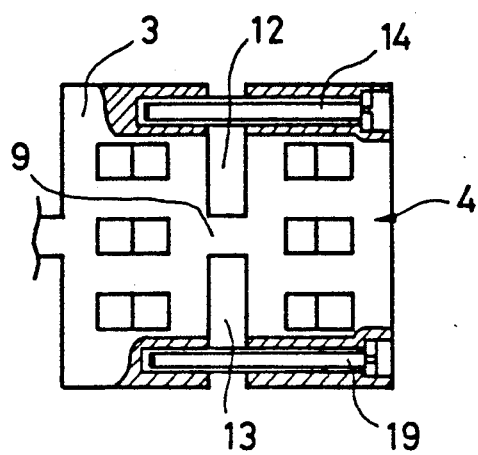
FIG. 3 is an enlarged view showing an essential part of the composite type magnetic head assembly of FIG. 2.

FIG. 3 shows a modification of the first embodiment in which another adjusting screw 19 is provided at an opposite side of the case 4 with respect to the joint part 9. By modifying the head assembly 1 of FIG. 2 as such, one can eliminate the compressional springs 16 and 17 and a more precise adjustment of the azimuth angle becomes possible.

Figure 4:
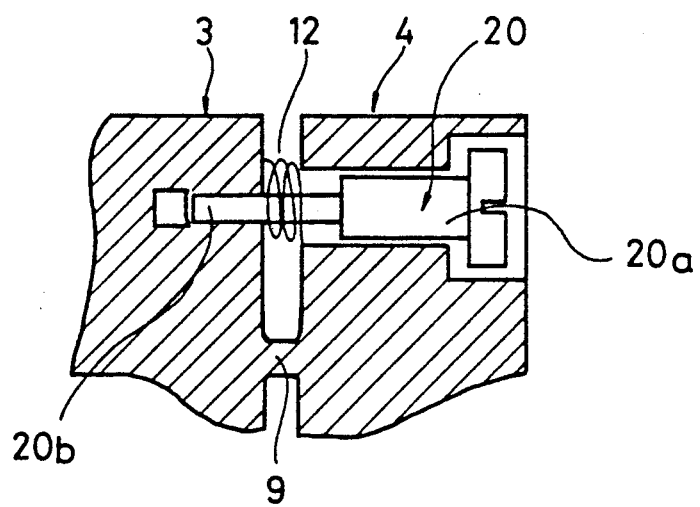
FIG. 4 is an enlarged view showing a part of the composite type magnetic head assembly shown in FIG. 3 in a further enlarged scale.

FIG. 4 shows a still another modification of the embodiment of FIG. 2 in which an adjusting screw 20 comprising a first part 20a having a first pitch and a second part 20b having a second pitch is used instead of the screw 14. By properly choosing the pitches, the precision for the azimuth angle adjustment is further improved.

Figure 5:
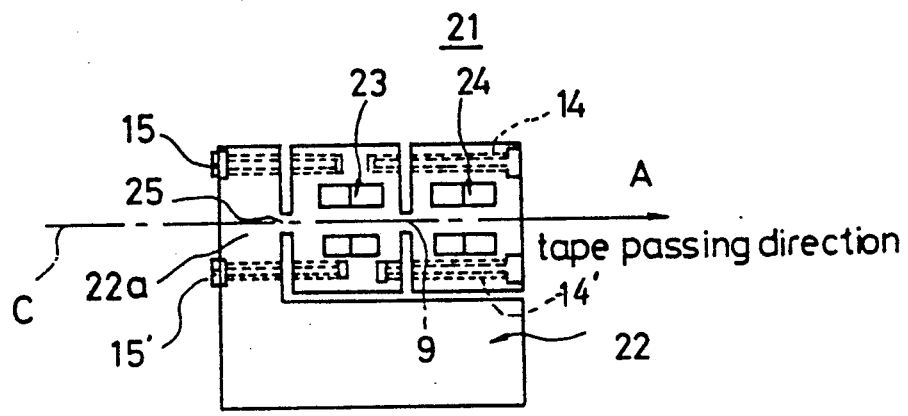
FIG. 5 is a schematical view showing a second embodiment of the present invention.

FIG. 5 shows a second embodiment of the present invention. In this embodiment, the composite type magnetic head assembly comprises a base 22 having an extension part 22a which projects in the lateral direction of the magnetic tape passing in the direction A, and a magnetic head 23 is connected to the extension part 22a at a downstream side of the magnetic tape by a joint part 25 having a reduced width. Further, a second magnetic head 24 is connected to the first magnetic head 23 at a downstream side thereof by another joint part which is identical to the joint part 9 in FIG. 2. This second joint part will be designated as the joint part 9. Further, in order to tilt the magnetic head 23 about the joint part 25 in the plane of the paper of FIG. 5 for azimuth angle adjustment, an adjusting screw similar to the adjusting screw 15 is inserted into the extension part 22a and screwed in a corresponding threaded hole in the magnetic head 23. This adjusting screw will be designated as the screw 15. Further, another adjusting screw 15' is penetrated through the extension part 22a at the other side with respect to the joint part 25 and is screwed in a corresponding threaded hole provided in the magnetic head 23. By adjusting the screws 15 and 15', the magnetic head 23 is tilted in the plane of the paper and the azimuth angle adjustment is achieved. Similarly, another pair of adjusting screws designated as the screws 14 and 14' are provided so as to penetrate through the magnetic head 24 from the downstream side to the upstream side of the tape transportation and screwed in the corresponding threaded holes in the magnetic head 23. By adjusting the screws 14 and 14', the azimuth angle of the magnetic head 24 is adjusted with respect to the magnetic head 23.

In the composite type magnetic head assembly having such a construction, the magnetic head acting as a positional reference such as the magnetic head 3 of FIG. 2 can be eliminated and thus the azimuth angle adjustment for such a reference magnetic head is eliminated. The azimuth angle adjustment is first applied to the base 22 itself such that the base 22 assumes a proper reference position and orientation with respect to the tape transport direction A, and then the azimuth angle is adjusted for the magnetic head 23 with respect to the base 22, and finally, the azimuth angle is adjusted for the magnetic head 24 with reference to the magnetic head 23.

Figure 6:
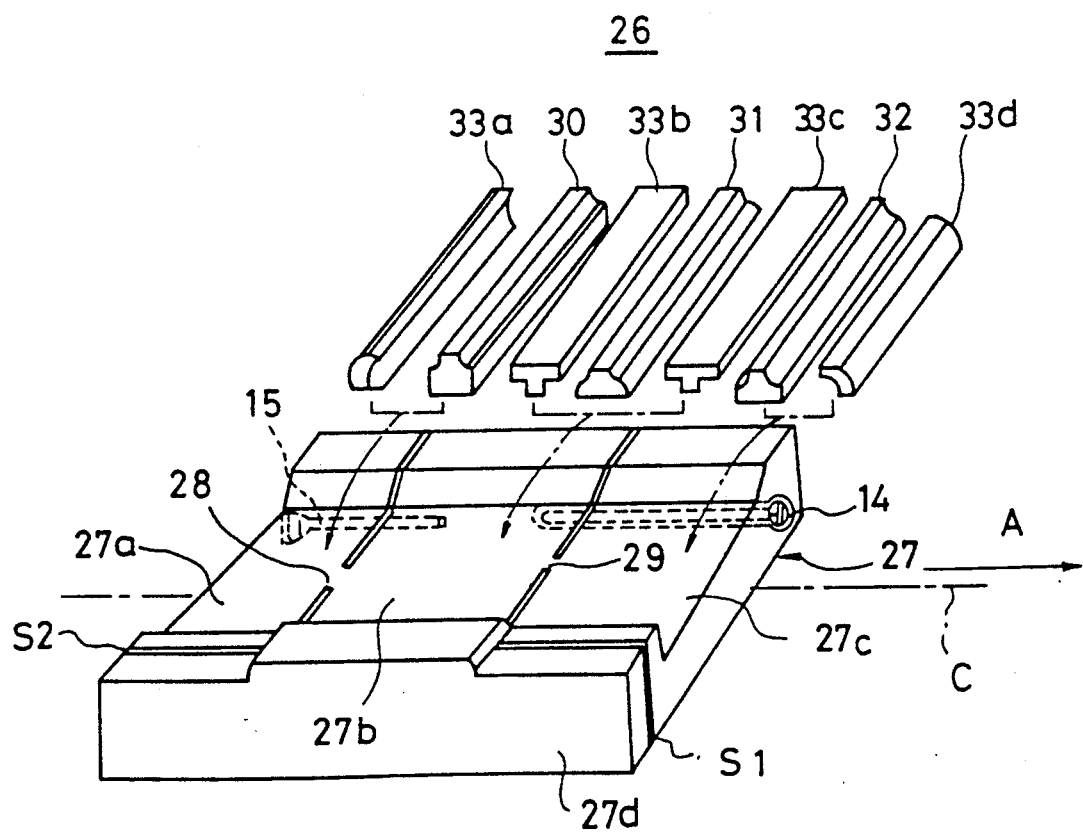
FIG. 6 is a perspective view showing a third embodiment of the present invention.

FIG. 6 shows still another embodiment of the present invention. In this embodiment, a base 27 is divided into three separate sections 27a-27c and these sections 27a-27c are used for carrying magnetic heads 30-32. The magnetic heads 30-32 are magnetically separated from each other by head shields 33a-33c which are also carried by the base sections 27a-27c. The sections 27a-27c are connected by a joint part 28 connecting the section 27a and section 27b and another joint part 29 connecting the section 27b and section 27c. Note that the joint parts 28 and 29 are formed centrally to the sections 27a-27c such that the joint parts 28 and 29 are aligned in the tape passing direction A on a center line passing through the sections 27a-27c. Further, a part of the section 27b at the center is extended laterally to the tape passing direction A and forms a base part 27d which is mounted on a frame of the magnetic recording-/reproducing apparatus. Note that there is defined slits S1 and S2 which separates the base part 27d from the section 27a or section 27c.

In order to change the azimuth angle of the magnetic heads 30-32 carried on the base 27, an adjusting screw corresponding to the screw 14 of FIG. 2 and designated as screw 14 is inserted into a through hole in the section 27c and screwed in a corresponding threaded hole provided in the section 27b. Further, another adjusting screw designated as screw 15 is inserted so as to penetrate through the first section 27a and is screwed in a corresponding threaded hole in the section 27b at a downstream side.

When carrying out the azimuth angle adjustment, the magnetic head 31 is provided on the second base section 27b and the azimuth angle for the head 31 is adjusted by adjusting the angle of the base part 27d with respect to the frame of the magnetic recording/reproducing apparatus. Next, the magnetic heads 30 and 32 as well as the shields 33a-33d are mounted on the sections 27a-27c and the azimuth angle adjustment for the magnetic head 30 is performed by adjusting the screw 15, and then for the head 32 by adjusting the screw 14. Thereby, the joint parts 28 and 29 act as the fulcrum located on the center line and the displacement of the magnetic heads associated with the adjustment of the azimuth angle is minimized.

Further, the present invention is not limited to these embodiments but various variations and modifications may be made without departing from the scope of the present invention.

What is claimed is:

1. A composite type magnetic head assembly for recording and/or reproducing an information signal on and from a magnetic tape transported in a predetermined direction, comprising:
    a plurality of magnetic heads aligned in said predetermined direction with a predetermined separation, each of the magnetic heads carrying a plurality of magnetic cores aligned generally perpendicularly to said predetermined direction;
    deformable connection means provided substantially in coincidence with a center line passing in said predetermined direction through a central part of said plurality of magnetic cores on each of the plurality of magnetic heads for providing a fulcrum deformably connecting said plurality of magnetic heads to each other; and
    adjusting means provided so as to engage with a pair of neighbouring magnetic heads for modifying said predetermined separation;
    each of said magnetic heads comprising a head body carrying said plurality of magnetic cores, and said deformable connection means comprising a connecting member formed as a unitary structure with the adjacent head bodies, said connecting member having a sufficiently reduced width, when measured perpendicularly to said predetermined direction in a plane parallel to that of the magnetic tape, for forming said deformable fulcrum between the magnetic heads, said connecting member connecting one body with a neighbouring head body on the center line for each pair of the magnetic heads.

2. A composite type magnetic head assembly as claimed in claim 1 in which said adjusting means comprises, for each pair of the head bodies, a penetrating hole provided on one of the head bodies so as to extend therethrough parallel to said predetermined direction, a corresponding threaded hole provided on a neighbouring head body in coincidence with a hypothetical extension of said penetrating hole, and an adjusting screw inserted into the penetrating hole and screwed in said threaded hole.

3. A composite type magnetic head assembly as claimed in claim 2 further comprising a resilient means for urging the pair of head bodies connected by the connecting member and the adjusting screw away from each other such that the predetermined separation between the magnetic heads is increased.

4. A composite type magnetic head assembly as claimed in claim 2 in which adjusting means are provided symmetrically about the deformable connection means.

5. A composite type magnetic head assembly as claimed in claim 2 in which said penetrating hole is threaded with a pitch which is different from that of the corresponding threaded hole.

6. A composite type magnetic head assembly for recording and/or reproducing an information signal on and from a magnetic tape transported in a predetermined direction, comprising:
    a plurality of magnetic heads aligned in said predetermined direction with a predetermined separation, each of the magnetic heads carrying a plurality of magnetic cores aligned generally perpendicularly to said predetermined direction;
    a base body comprising a plurality of mounting parts in correspondence to said plurality of magnetic heads for carrying the magnetic heads thereon in alignment in said predetermined direction and a connecting part formed between the mounting parts in coincidence with a center line passing centrally, in said predetermined direction, through the plurality of magnetic cores held in the plurality of magnetic heads, said connecting part having a reduced width measured perpendicularly to said predetermined direction in a plane parallel to that of the magnetic tape so as to form a deformable fulcrum between the mounting parts; and
    adjusting means provided so as to engage with a pair of mounting parts for modifying said predetermined separation between the magnetic heads,
    one of said mounting parts being rigidly connected to a base part for mounting the head assembly on a frame of a magnetic recording/reproducing apparatus, and
    said mounting part rigidly connected to the base part being located between a pair of mounting parts.

7. A composite type magnetic head assembly as claimed in claim 6 in which said adjusting means comprises, for each pair of the mounting parts, a penetrating hole provided on one of the mounting parts so as to extend therethrough parallel to said predetermined direction, a corresponding threaded hole provided on a neighbouring mounting part in coincidence with a hypothetical extension of said penetrating hole, and an adjusting screw inserted into the penetrating hole and screwed in said threaded hole.

* * * * *